Figures 1, 2:
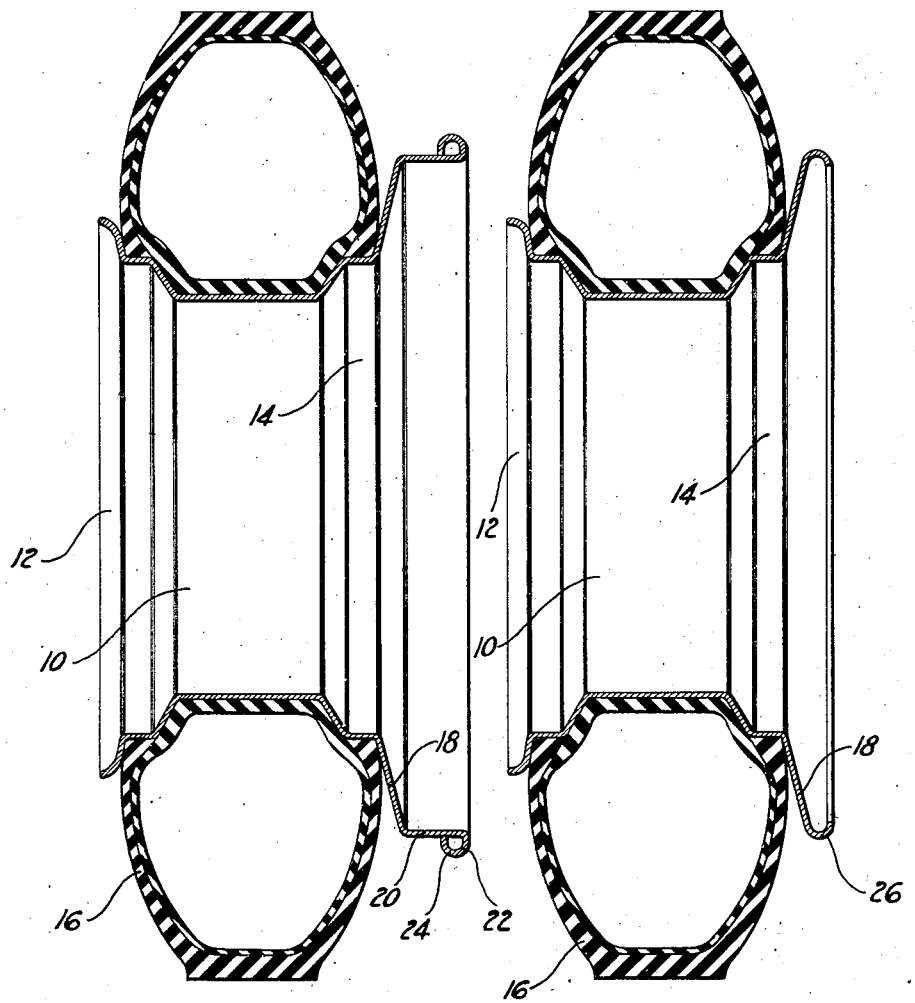

Nov. 28, 1933.  L. E. LA BRIE  1,936,877
WHEEL
Filed March 16, 1932

INVENTOR.
LUDGER E. LA BRIE
BY
ATTORNEY

Patented Nov. 28, 1933

1,936,877

UNITED STATES PATENT OFFICE

1,936,877

WHEEL

Ludger E. La Brie, South Bend, Ind., assignor to Bendix Aviation Corporation, South Bend, Ind., a corporation of Delaware Application March 16, 1932. Serial No. 599,258

3 Claims. (Cl. 301—6)

This invention relates to wheels and more particularly to wheels for airplanes and motor vehicles.

Broadly, the invention comprehends a wheel including a rim having a prolonged flange for the purpose of reducing the drop upon deflation of the tire carried on the rim.

In the illustrated embodiment of the invention, one flange of the rim has a prolongation or extension formed to provide a brake drum. This structure makes it possible to use a brake of a relatively small diameter.

An object of the invention is to provide a rim for a low pressure tire having means for reducing the drop upon deflation of the tire.

Another object of the invention is to provide a rim for a low pressure tire having a prolonged flange or tire retaining bead.

Another object of the invention is to provide a rim for a low pressure tire having one of its flanges extended a substantial distance from the periphery of the rim and provided with a rolled edge.

Another object of the invention is to provide a rim for a low pressure tire having one of its flanges prolonged and deformed to provide a brake drum.

A further object of the invention is to provide a rim for a low pressure tire having one of its flanges extended and deformed to provide a drum having on its outer periphery a bead or tread adaptable for engagement with the ground upon deflation of the tire.

A feature of the invention is a rim having a prolonged flange.

Another feature of the invention is a rim having a prolonged flange deformed to provide a brake drum.

A further feature of the invention is a rim having a prolonged flange deformed to provide a brake drum provided with a rolled edge adaptable for engagement with the ground upon deflation of the tire.

Other objects of the invention will appear from the following description taken in connection with the drawing, which forms a part of this specification, and in which:

Figure 1 is a vertical sectional view of a rim and a tire assembled thereon illustrating the preferred embodiment of the invention; and Figure 2 is a similar view illustrating a modification of the invention.

Referring to the drawing for more specific details of the invention, 10 represents a wheel rim preferably of the drop center type. The rim has retaining flanges 12 and 14. Positioned on the rim between the flanges is a low pressure tire, 16.

The flange 14 is extended radially as indicated at 18 to a distance substantially one-half of the thickness of the tire, and the extended portion 18 is deformed to provide the drum 20 having a flange 22, turned to provide a bead or tread 24 adaptable for engagement with the ground upon deflation of the tire.

Because of this structure, the drop of an axle of a motor vehicle or airplane due to deflation of the tire is relatively small. Furthermore, the structure permits the use of a brake of relatively large outside diameter, since the brake may be made with a diameter almost as large as the outside diameter of the rim, the only limitations being the conditions imposed by the deflation of the tire.

A modification of the invention is illustrated in Figure 2, wherein the prolonged portion 18 of the flange 14 is turned to provide a rolling surface 26 for engagement with the ground, upon deflation of the tire. In this structure the braking flange is omitted.

While preferred embodiments of the invention have been described, it is to be understood that these are given merely as examples of the underlying principles of the invention, and since these may be incorporated in other specific mechanical structures, I do not intend to be limited to those shown except as such limitations are clearly imposed by the appended claims.

Having thus described the various features of the invention, what I claim as new and desire to secure by Letters Patent, is:

1. A rim having retaining flanges, one of the flanges being prolonged and deformed to provide a brake drum.

2. A rim having retaining flanges, one of the flanges being prolonged, a brake drum formed on the prolongation, and a flange on the drum turned to provide a tread.

3. A one piece drop center rim adapted for a pneumatic tire and having retaining flanges, one of said flanges being prolonged, a brake drum formed on the prolongation, and a bead formed on the end of said prolongation adapted for use as a tread in the absence or deflation of the tire.

LUDGER E. LA BRIE.